Jan. 18, 1927.
H. LUNDQUIST
1,614,530
FLOW ACTUATED DEVICE
Filed Dec. 15, 1922
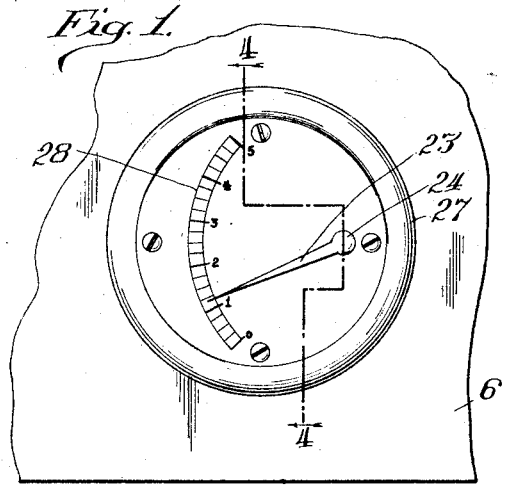
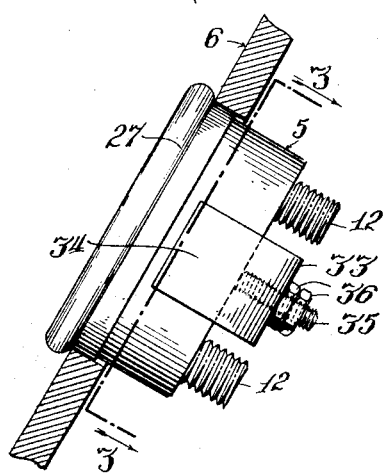
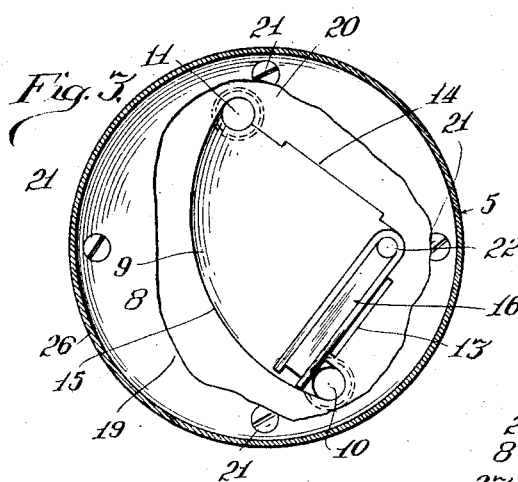
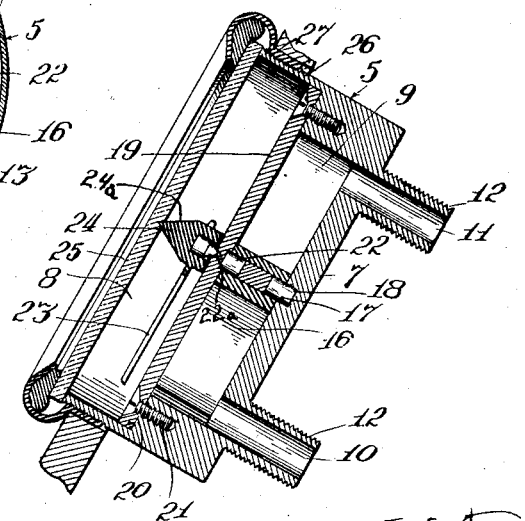
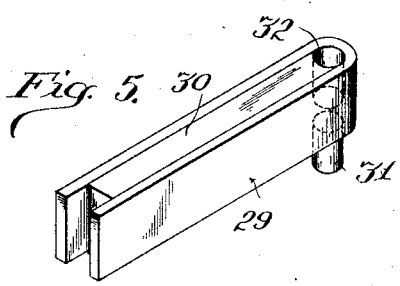
Inventor
Hans Lundquist
By Daniel Brennan
Attorney Patented Jan. 18, 1927.

1,614,530

UNITED STATES PATENT OFFICE.

HANS LUNDQUIST, OF CHICAGO, ILLINOIS, ASSIGNOR TO UNITED STATES SPECIALTY CORPORATION, OF CHICAGO, ILLINOIS, A CORPORATION OF ILLINOIS.

FLOW-ACTUATED DEVICE.

Application filed December 15, 1922. Serial No. 607,094.

This invention relates broadly to fluid pressure and flow actuated devices, and more particularly to an improved apparatus for indicating the rate of flow of fluid, so that the observer, at a glance, may be apprised accurately, at all times, of the exact amount of fluid passing a given point in a given time interval.

While this invention is primarily intended as an improvement in flow-registering gauges and is illustrated as such, and more specifically as applied to lubrication systems, it will be readily apparent that it has other equally useful purposes, and as a consequence finds a wide field of utility.

The principal objects and advantages which characterize this invention reside in the provision of an improved flow-indicator which is compact and fluid and liquid-tight, and may be quickly and easily installed in an oil, gasoline or other fluid conductor for the purpose of indicating the rate of fluid flow; the provision of an improved construction and arrangement of flow actuated element and indicating element; the provision of an improved construction of flow actuated element; and the provision of an apparatus of the character described wherein moving parts are reduced to a minimum; wherein packing gaskets and other joints are largely eliminated, in order to generally improve such devices by simplification, and to prevent leakage.

The nature of the device of this invention is such that it is accurately calibrated to measure rate of flow, and, while it is interposed in series with the fluid conductor, acts in no way to impede materially the volume or rate of flow of fluid.

The foregoing and such other objects and advantages as may appear or be pointed out as this description proceeds are attained in the structural embodiment illustrated in the accompanying drawing, wherein:

Figure 1 is a front elevational view of the device of this invention;

Figure 2 is side elevational view;

Figure 3 is a vertical transverse sectional view on line 3—3 of Figure 2, looking in the direction indicated by the arrows;

Figure 4 is a vertical longitudinal section view taken on line 4—4 of Figure 1, looking in the direction indicated by the arrows; and Figure 5 is a perspective view of a modified form of one of the parts of the device.

The device of this invention comprises generally a vane or other pivoted movable element disposed in a flowing stream of fluid and adapted to be deflected from a normal position to a point depending upon the velocity of the stream, together with an indicating element which moves over a scale which is properly calibrated to indicate the rate per minute or for any other time period. To prevent leakage the vane is placed in a sealed casing and is not mechanically connected to the indicating element, but by magnetism of one or the other causes the indicating element to move in unison with the vane in the casing.

Referring more particularly to the drawing, I provide a casing 5, which, for convenience in installing in the dashboard 6 of an automobile, it preferably circular, open at its front, and provided with a rear closing wall 7. The casing, being in the form of an integral casting, is provided with an outer chamber 8, and an inner chamber 9, the latter having an inlet port 10, and an outlet port 11, the rear wall 7 having threaded nipples 12—12 for accommodating said ports.

From an inspection of Figure 3, it will be observed that the chamber 9 is cut in the casing to a shape defined by the radial walls 13 and 14, approximately ninety degrees apart, and the arcuate wall 15. The wall 15 is described from a point eccentric to that at which the walls 13 and 14 meet, and the ports 10 and 11 enter the chamber 9 at the junctions of the walls 15 and 13, and 15 and 14, respectively. Thus the chamber 9 increases in area from the wall 13 to the wall 14.

The flow actuated vane preferably comprises a segment 16, provided with a pintle 17, which enters into and is revoluble in a bearing 18 and the wall 7, such bearing being located at the junction of the radial walls 13 and 14. The segment 16 is made of steel and is permanently magnetized, the segment being of such length that when in the lower position, (Figure 3) it extends to the wall 15 and closes the inlet.

The chamber 9 is closed by a dial plate 19. which seats on a shoulder 20, said plate being secured fluid tight by the provision of a series of screws 21, and thus the plate isolates the compartments 8 and 9. The plate is provided with a fixed pintle 22, which is in axial alinement with the pintle 17 on the segment 16. A needle carrying hub member 24 is provided having an outer conical portion 24ᵃ seating in a bearing recess in the plate 25, and said hub also has a pintle 22ᵃ seated in and projecting from a suitable axial recess in the hub and into a conical recess in the member 19, the hub thus being rotatably suspended in the members 19 and 25. The outer end of the hub 24 is tapered and may engage in a suitable recess in the glass cover plate 25, which latter seats on the externally threaded annular wall 26, which latter receives the cover retaining annulus 27.

The dial plate 19 is provided with an arcuate calibrated scale 28 in full view of an observer, and the end of the needle 23 sweeps over said scale, in accordance with the displacement of the segment 16.

In Figure 5 a modified construction of the vane is shown wherein the vane comprises a U-shaped portion 29, which is magnetized, and a body 30, which may be of non-magnetic metal. A pintle 31 is formed on the body 30, and a circular opening 32 is provided in alinement with the axis of the pintle 31.

The flow indicating device of this invention is secured to the dash 6 by the provision of a U-shaped bracket 33, which embraces the casing 5, said bracket having feet 34 for securement to the back of the dash. A threaded stud 35 is provided on the wall 7 and said stud extends through the medial portion of the bracket. Lock-nuts 36 secure the stud in the bracket, and as the annulus 27 abuts the margin of the opening in the dash, the device is fixedly held against displacement.

When installed, the lower of the nipples 12 is connected to the oil or other fluid line from a pump, (not shown) and the upper nipple is connected to a continuation of said line to the engine or other point at which the fluid, if lubricant, is to be used. As the fluid flows from the inlet port 10, it strikes the adjacent portion of the vane 16 and deflects same upwardly. Upon the rate of flow depends the degree of deflection of the vane, the outer end thereof receding, in effect, from the wall 15 as the velocity of the fluid increases, thus permitting the resultant increase in volume passing through the device. It will be seen that by virtue of this arrangement the flow is not interfered with or retarded to any appreciable extent. Due to the magnetic influence of the vane 16 the needle is caused to register a complemental position thereto at all times, thereby indicating the rate of flow on the scale. Of course, it will be readily understood that the casing and associated inclosing parts of the device should be made of non-magnetic metal, such as brass or an alloy.

Equally important features of this invention in addition to those hereinbefore pointed out, are: the manner of providing the chamber 9, wherein it is cut into the rear portion of the casing, thus eliminating the provision of any separate parts, in so far as the casing itself is concerned and thus removing at least one element to cause leakage; this arrangement, in combination with the dial plate which serves to make a liquid tight closure; and the arrangement of the pivot for the vane 16 whereby canting or jamming of the vane in course of its movement, is prevented and the similar mounting of the needle for a similar purpose.

While a specific construction of this invention is described and shown, I reserve the privilege of modifying same within the spirit of the invention and scope of the claims.

I claim:

1. In a flow meter, in combination, a casing having a chamber defined by a curved wall, and two radial walls of unequal lengths, said radial walls having inlet and outlet ports adjacent the junctions of the radial walls and said curved wall, and a magnetized vane pivoted at the junction of said radial walls for movement in said chamber in response to flow from said inlet to said outlet, and the free end of said magnetized vane receding from the curved walls as such vane is displaced toward the outlet, a removable wall closing said chamber and on which said vane is additionally pivoted, and an indicator pivoted on said closing wall and non-mechanically connected to but operable by magnetic influence of said vane.

2. In a flow meter, in combination, a casing having a chamber defined by relatively inclined radial walls of unequal lengths and a curved wall joining said radial walls, said radial walls having inlet and outlet ports adjacent the junctions of the radial and curved walls, and a vane pivoted at the junction of the radial walls for movement in said chamber in response to flow from said inlet to said outlet port.

3. In a flow meter, in combination, a casing having a chamber defined by a curved wall, and two radial angularly related walls of unequal lengths, said radial walls having inlet and outlet ports adjacent the junctions of radial walls with said curved wall, and a magnetized vane pivoted at the junction of said radial walls for movement in said chamber in response to flow from said inlet to said outlet, and the free end of said vane receding from the curved wall as such vane is displaced toward the outlet, a removable wall closing said chamber and on which said vane is additionally pivoted, and an indicator on said removable wall and displaced by movement of said vane.

In testimony whereof, I attach my signature at 36 W. Randolph St., Chicago, Illinois.

HANS LUNDQUIST.